United States Patent [19]

Jarret et al.

[11] Patent Number: 4,579,181
[45] Date of Patent: Apr. 1, 1986

[54] VEHICLE GUIDED BY THE INDIVIDUAL TORQUE APPLIED TO ITS DRIVING WHEELS AND A METHOD FOR TURNING SAID VEHICLE

[76] Inventors: Jean M. B. Jarret; Jacques H. Jarret, both of 133 av. Maréchal Foch - B.P. 7, 78130 Les Mureaux, France

[21] Appl. No.: 629,736

[22] Filed: Jul. 9, 1984

[30] Foreign Application Priority Data

Jul. 20, 1983 [FR] France .............................. 83 11956

[51] Int. Cl.⁴ .............................................. B62D 11/04
[52] U.S. Cl. ..................................... 180/6.5; 180/212; 180/308
[58] Field of Search ...................... 180/6.48, 6.5, 6.28, 180/308, 212, 21

[56] References Cited

U.S. PATENT DOCUMENTS

| | | | |
|---|---|---|---|
| 3,656,570 | 4/1972 | Gortnar et al. ..................... | 180/6.48 |
| 3,970,160 | 7/1976 | Nowick ................................. | 180/6.5 |
| 4,235,297 | 11/1980 | Porta .................................... | 180/6.48 |

FOREIGN PATENT DOCUMENTS 0044773 1/1982 European Pat. Off. .
1523399 5/1968 France .

Primary Examiner—John A. Pekar
Attorney, Agent, or Firm—Young & Thompson

[57] ABSTRACT

A land vehicle for producing side-slip of the rear wheels while the front wheels determine a curved path of travel having a short radius comprises four driving wheels having a fixed orientation in the longitudinal direction of the vehicle. Each wheel (1, 2) is associated with an individual electric motor. After detecting its angular position, the speed of the wheels is controlled in dependence on a reference value which is determined as a function of a desired path of travel. The ratio of maximum tangential force (T1 or T2) transmitted to the periphery of the wheel to weight (P1 or P2) transmitted to the ground by said wheel is lower than the usual coefficient of friction of the wheel with the ground in the case of the two front driving wheels (1) and higher than the usual coefficient of friction of the wheel with the ground in the case of the two other driving wheels (2) which are closer to each other than the front wheels (1).

10 Claims, 6 Drawing Figures

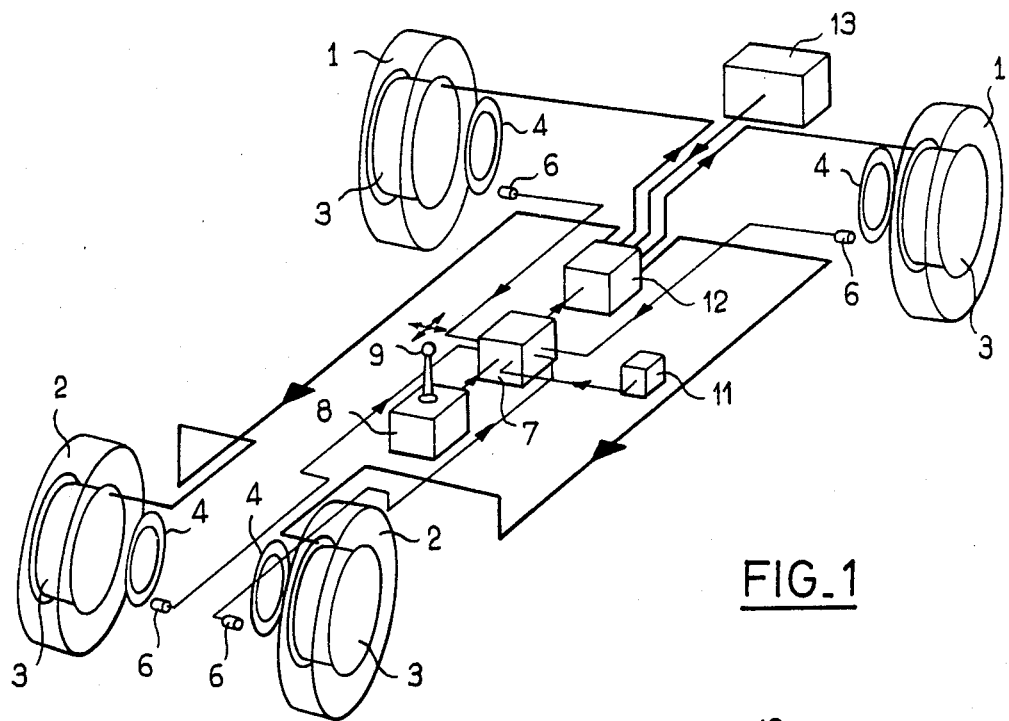
FIG_1
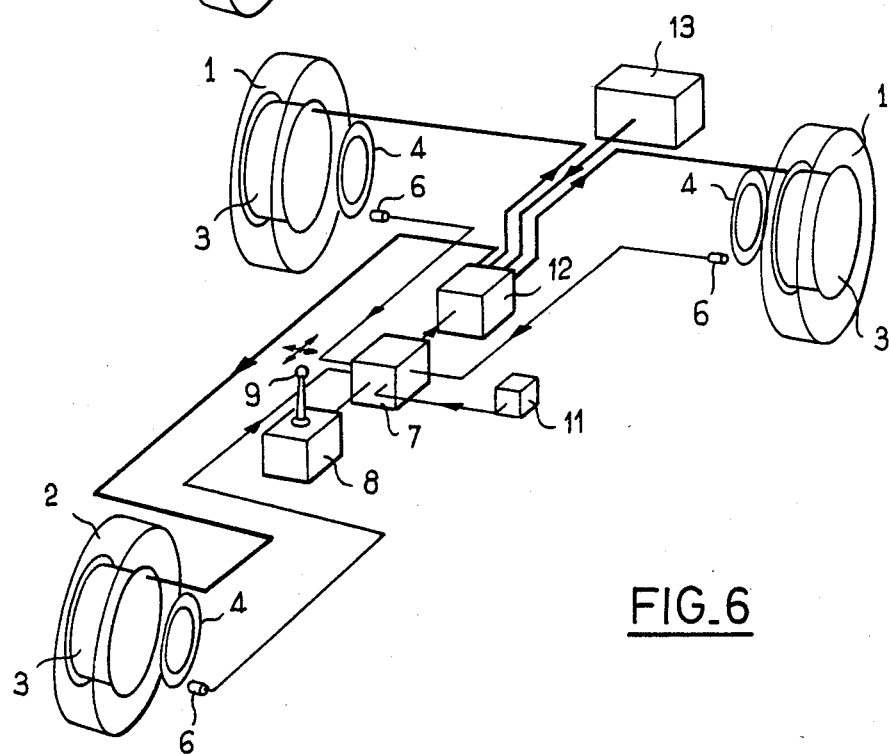
FIG_6

VEHICLE GUIDED BY THE INDIVIDUAL TORQUE APPLIED TO ITS DRIVING WHEELS AND A METHOD FOR TURNING SAID VEHICLE

This invention relates to a vehicle guided by independently controlling the torque applied to two lateral driving wheels.

This invention also relates to a method for turning a vehicle of this type.

European Pat. No EP-A 44773 describes a vehicle having two lateral driving wheels driven by respective electric motors which are controlled in such a manner as to produce a suitable torque in respect of a speed reference value. The vehicle further comprises at least one freely orientable wheel or so-called swiveling wheel. In order to negotiate a curve, means are provided for establishing the speed reference value for each of the two driving wheels in order to ensure that the driving wheel located at the exterior of the curve has positive acceleration relative to the other driving wheel. During this time interval, the swiveling wheel has turned so as to follow the path imposed by the driving wheels.

By means of this system, a vehicle can be turned on circles of very short radius and even in situ if the two driving wheels are caused to rotate in opposite directions.

However, the swiveling wheel has low stability, especially at medium or high speeds. Such a wheel offers only low resistance to the centrifugal force exerted on a vehicle which is turning. Furthermore, it is difficult to adapt a brake system to a wheel of this type and practically impossible to convert it to a driving wheel.

In another known class are the so-called all-purpose vehicles used for rough terrain and provided with six wheels. Each side of the vehicle has three equidistant wheels which are maintained parallel to the longitudinal direction of the vehicle. In order to turn this vehicle either to the left or to the right, the torque is transferred to the driving wheel or wheels located on the opposite side. In this design, steering is performed by controlling the torque without having recourse to freely orientable or swiveling wheels. However, the paths of travel corresponding to a short turning radius are imprecise since they are produced in conjunction with simultaneous skidding of at least four out of the six wheels and this skidding cannot readily be controlled. A vehicle of this type can prove very easy to maneuver in open country but is ill-suited to city driving conditions which call for precise steering in order to avoid contact with other vehicles.

The aim of the invention is thus to construct a vehicle which is guided by independently controlling the torque applied to two lateral driving wheels and has the maneuverability of the first known design while being similar to the second known design in that it is free from the instability associated with swiveling wheels.

The invention is thus directed to a land vehicle comprising at least two lateral driving wheels and at least one other driving wheel, said driving wheels being given a substantially fixed orientation in the longitudinal direction of the vehicle, a power supply source, and means for adjusting the torque applied to each of said driving wheels as a function of the desired path of travel.

The distinctive feature of the vehicle in accordance with the invention lies in the fact that, in the case of a given driving wheel, the ratio between the maximum tangential force transmitted to the periphery of the wheel and the weight transmitted to the ground by said wheel is lower than the usual coefficient of friction of the wheel with the ground in the case of both lateral driving wheels and is higher than the usual coefficient of friction of the wheel with the ground in the case of each of the other driving wheels aforesaid.

By "coefficient of friction" is meant in this instance the ratio between the tangential force required for ensuring that a wheel in the state of adherence undergoes a transition to a state of side-slip and the force transmitted by the wheel at right angles to the ground.

By "usual coefficient of friction" is meant the coefficient of friction as defined above between the wheel and the ground surface with which it is usually in contact.

Thus in order to make a turn in a circular path having a very short radius, respective torques corresponding to the desired path are applied to both lateral driving wheels while applying to each of the other driving wheels aforesaid a torque such that the ratio of the resultant tangential force at the periphery of the wheel to the weight transmitted by said wheel to the ground is higher than the coefficient of friction of the wheel with the ground. Each driving wheel which is subjected to the aforesaid torque necessarily loses its adherence. In consequence, the two lateral driving wheels subjected to a torque which satisfies the conditions of road adherence are capable of imposing the desired path on the vehicle. The path of travel is therefore determined with precision by the two lateral driving wheels in compliance with city traffic requirements.

According to another aspect of the invention, the method for turning a vehicle comprising at least two lateral driving wheels and at least one other driving wheel, in which the torque imposed on each of the lateral driving wheels is adjusted so that the ratio of the tangential force at the periphery of the wheel to the weight transmitted to the ground by said wheel should be lower than the coefficient of friction of the wheel on the ground and such that each of the two lateral driving wheels should have with respect to the other wheel relative accelerations corresponding to the desired variation in radius of curvature of the path of travel, and in which each driving wheel aforesaid is maintained substantially parallel to the longitudinal direction of the vehicle, is distinguished by the fact that the torque imposed on each of the other driving wheels aforesaid is so adjusted as to ensure that the ratio of the tangential force at the periphery of the wheel to the weight transmitted to the ground by said wheel is higher than the coefficient of friction of the wheel on the ground.

Other features of the invention will be more apparent upon consideration of the following description and accompanying drawings, wherein :

FIG. 1 is a schematic exploded view in perspective showing a vehicle in accordance with the invention;

FIG. 6 is a view which is similar to FIG. 1 but relates to a three-wheeled vehicle.

Figure 2:
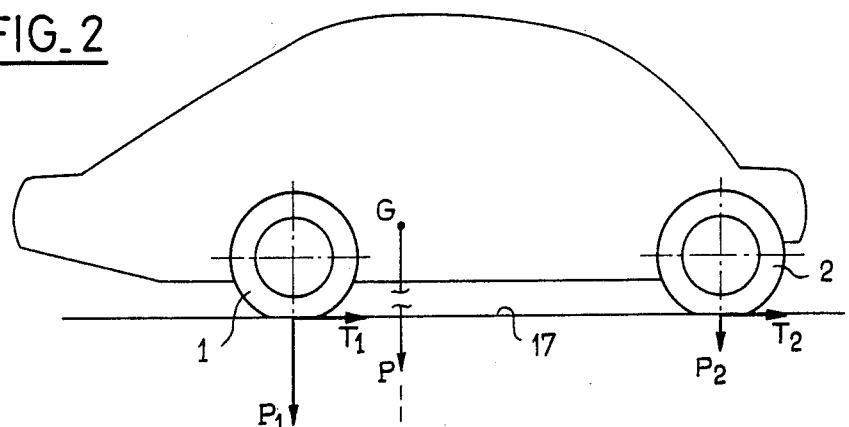
FIG. 2 is a schematic view of said vehicle in side elevation.
Figure 3:
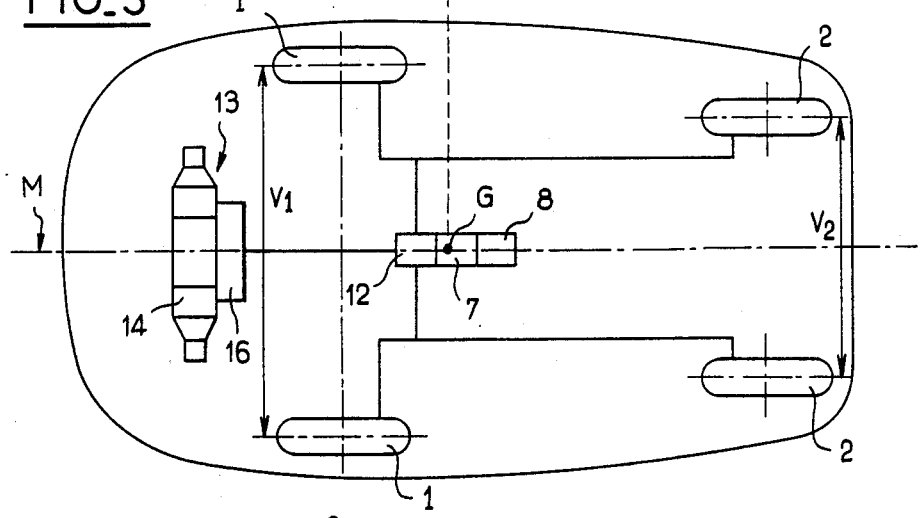
FIG. 3 is a schematic plan view of the vehicle of FIGS. 1 and 2.

In the examples of FIGS. 1 to 3, the vehicle is provided with a four-wheel system comprising two front lateral driving wheels 1 and two rear lateral driving wheels 2. The pair of wheels 1 and the pair of wheels 2 are disposed symxetrically on each side of a longitudinal mid-plane of the vehicle. Furthermore, these wheels 1 and 2 are mounted in such a manner as to be permanently disposed substantially parallel to the longitudinal midplane of the vehicle. In other words, these wheels are not steerable.

In the example illustrated, each wheel of the pair 1 and 2 is of the programmed-movement type, which means that the speed of rotation of each wheel is determined by means of the type already described in regard to the two driving wheels of the vehicle disclosed in European Pat. No. EP-A-44773. These means are recalled below in their essential aspects. Each wheel of the pairs 1 and 2 is actuated by a variable-reluctance synchronous electric motor 3 having a relatively large number of stator commutations per wheel revolution, namely between a few tens and several hundreds. The motors 3 are equipped with position detectors 4, said detectors being associated with the rotor and adapted to cooperate with photoelectric cells 6 which are associated with the stator in order to permit detection of the relative positions of the rotor teeth and stator contacts. Pulses which are equal to or multiples of the number of rotor teeth are delivered at each revolution by the photoelectric cells 6 to a computer 7.

Another input of the computer 7 is connected to an output of a transducer 8 which is adapted to carry a manual control lever 9. In certain designs, said lever 9 can be displaced by the driver in all directions in accordance with two components, namely a front-rear component and lateral components. In the example considered in this case, the lever 9 carries at its base an electric lamp which is adapted to cooperate with four photoelectric cells (not illustrated) arranged diagonally at 45°. It is apparent that, depending on the orientation given to the lever, the differential illumination of the cells produces specific actions. The front-rear component corresponds to orders for acceleration or slowing-down of the vehicle whereas the lateral component which will alone be contemplated in this instance corresponds to a directional action.

In other designs, the lever 9 is stationary but is coupled to strain gages which are responsive to stresses exerted in the directions aforesaid in order to give the orders for acceleration, slowing-down or changing direction.

Finally, the computer 7 receives a signal from a clock 11 which serves as a time base for the system.

The output of the computer 7 drives a generator 12 for producing electric pulses which are applied independently to the motors 3 of the wheels 1 and 2. Said generator is supplied with electric power from a power source 13 which, as shown in FIG. 3, can be constituted by a current generator 14 coupled to a storage battery 16.

As shown in FIG. 2, the weight P of the vehicle which is exerted at its center of gravity G is distributed in two components P1 transmitted to the ground by the two front wheels 1 and in two components P2 transxitted to the ground by the rear wheels 2. The values of the components P1 and P2 are considered when the vehicle is stationary.

Furthermore, each wheel 1 and 2 which is driven independently by a motor 3 cannot be subjected to a torque exceeding a maximum value which, taking into account the radius of the wheels 1 and 2, corresponds to a maximum tangential force transmitted to the ground or road surface by the periphery of the wheel. This maximum tangential force is designated by the reference T1 in the case of the front wheels 1 and by the reference T2 in the case of the rear wheels 2.

In accordance with an important feature of the invention, steps are taken to ensure that the ratio $K1 = T1/P1$ is lower than the coefficient of friction $f1$ of the wheels 1 on a ground surface 17 of usual nature such as dry macadam and to ensure that the ratio $K2 = T2/P2$ is higher than the coefficient of friction $f2$ between the wheels 2 and the ground surface 17.

In the example herein described, the wheels 1 and 2 have the same diameter and the maximum torques which can be applied thereto have the same value, with the result that T1 and T2 are equal. Moreover, the wheels 1 and 2 are fitted with pneumatic tires and the coefficient of friction considered as usual is that of a tire with a dry tarred roadway, which is of the order of 1 in the case of the wheels 1 as in the case of the wheels 2.

Thus compliance with the conditions $K2>f2$ and $K1<f1$ entails the need to position the point G at a sufficiently short distance from the axis of the wheels 1. It will be readily understood that the point G must be located between the axis of the wheels 1 and the axis of the wheels 2 in order to ensure suspension of the vehicle.

By way of example, the maximum torque determined by the computer 7 and applied to each wheel 1 or 2 by its individual motor 3 is 400 N.m. If the height of the wheel with respect to the ground is 0.3 m, this value of torque accordingly produces a maximum tangential force T1 or $T2 = 400/0.3 = 1\ 333$ N. The wheel-base (distance between the shaft or axis of the front wheels 1 and the shaft or axis of the rear wheels 2) is 1.8 m. The total weight of 815 kg is distributed in such a manner as to ensure that the vertical projection of the center of gravity on the ground surface 17 which is assumed to be a flat surface is located at a distance of 0.45 m from the projection of the axis of the front wheels 1 and therefore at a distance of 1.35 m from the axis of the rear wheels 2. Except for the inertia force produced by braking, acceleration or tilt, each front wheel 1 applies a vertical force $P1 = 3000$ N and each rear wheel 2 applies a vertical force $P2 = 1000$ N. The maximum tangential force T1 or T2 is therefore distinctly lower than the force of gravity P1 in the case of each of the two front wheels 1 and distinctly higher than the force of gravity P2 in the case of each of the two rear wheels 2.

Furthermore, the wheels for which the ratio of maximum tangential force applied to the ground to weight transmitted to the ground is higher than the coefficient of friction. In other words the rear wheels 2 in the example illustrated have a wheel-track (otherwise known as tread, or lateral spacing between the midplanes of the wheels) which is shorter than the track between the two other wheels. By way of example, the track V1 between the front wheels 1 can be 1.4 m whilst the track V2 between the rear wheels 2 can be 1.1 m.

As represented schematically in FIG. 3 by connections such that the wheels 1 and 2 located on one side of the vehicle are connected in common with the switch 12, the computer 7 is programmed in such a manner as to ensure that the wheels on one and the same side are continuously controlled in dependence on the same speed reference value. The connections thus shown in FIG. 3 are purely schematic since, as will be apparent hereinafter, a wheel 2 may under certain conditions require a larger amount of power than the wheel 1 located on the same side in order to rotate at the same speed as this latter, or conversely, with the result that separate power supplies are clearly required for each wheel.

The operation of the vehicle shown in FIGS. 1 to 3 will now be described and will include the description of the method in accordance with the invention.

When the vehicle is traveling in a straight line, the computer 7 determines the same speed for the four wheels 1 and 2 and can have speed reference values for ensuring that the wheels 1 which are most strongly applied on the ground transmit a larger amount of power than the wheels 2. As taught in the European Patent Application cited earlier, speed control of the wheels 1 and 2 is obtained by controlling the angular position of the wheel at each instant by means of detection systems 4, 6, with the result that a wheel which is retarded by a disturbance is not only restored to its speed after the disturbance but the time-delay caused by the disturbance is compensated in such a manner as to restore the wheel to its theoretical angular position in each point of the path of travel, with the result that disturbances are automatically compensated without any need for intervention on the part of the driver.

Figure 4:
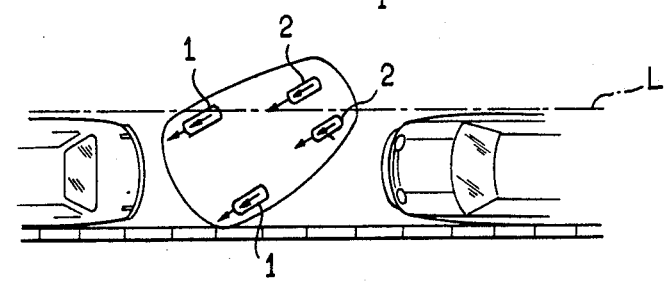
FIGS. 4 and 5 are schematic plan views showing two stages of parking lengthwise between two other vehicles parked along a curb, this parking operation being performed by the vehicle of FIGS. 1 to 3.
Figure 5:
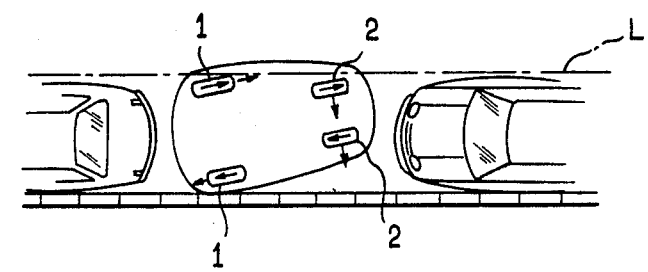

With reference to FIGS. 4 and 5, there will now be described the method adopted in order to make a turn in a circular path having a very short radius, assuming by way of example that the vehicle is being parked lengthwise between two other vehicles parked along a curb.

In these figures, there is shown on each wheel 1, 2 an arrow in the direction in which said wheel tends to move by adherence with the ground and, in the vicinity of each wheel, an arrow in the direction of its effective displacement.

As shown in FIG. 4, the vehicle is engaged obliquely in the parking space in such a manner as to ensure that the wheels for which the ratio K is lower than the coefficient of friction (namely the front wheels 1 in the example described) are located at the front end. On completion of this initial stage of operation, the front part of the vehicle is already located nearly in its final parked position (except for a difference in orientation) whilst the rear end is still completely outside the parking alignment L. The driver then stops the vehicle and actuates the lever 9 solely in the lateral direction in order to produce a steering lock which, when traveling with the wheels 1 at the front end, would be directed externally of the alignment L.

As shown in FIG. 5, the order thus given by the driver is interpreted by the computer 7 as an order for pivotal displacement of the vehicle in situ. The computer 7 delivers a command for initiating rotation of the wheels 1 in opposite directions so that the wheel 1 located on the side toward which the vehicle is to be turned rotates in reverse. As has already been noted, each wheel 2 is controlled in dependence on the same speed reference value as the wheel 1 located on the same side. The wheels 1 and 2 therefore tend to rotate at speeds which are incompatible without side-slip of at least one of the two pairs of wheels 1 and 2. In view of the fact that it is impossible to carry out the order with low driving torques, the computer 7 initiates an increase in the individual driving torques applied to the wheels 1 and 2 in order to overcome the resistance set up by adherence of the wheels on the road surface. In point of fact, however, the maximum torque which is applicable to the wheels 1 and satifies the relation $T1/P1 < f1$ cannot overcome the resistance set up by adherence of the wheel 1 on the road surface. On the other hand, the torque which is applicable to the wheels 2 and satisfies the relation $T2/P2 > f2$ may be sufficient to overcome the resistance offered by adherence of the wheels 2 on the roadway. The computer 7 will accordingly initiate an increase in the driving torques until the wheels 2 lose their adherence relative to the road surface 17. This will not result in racing of the wheels 2 since the speed of these latter is controlled so as to be equal to the speed of the wheels 1. However, as a result of loss of adherence of the wheels 2 with respect to the road surface 17, the friction forces between the wheels 2 and said road surface 17 decrease to an appreciable extent, with the result that the wheels 1 which have retained their adherence are capable of carrying out their movement in compliance with the speed reference value by causing pivotal displacement of the vehicle about a point located at the center of their common axis whilst the wheels 2 undergo a side-slip displacement in a direction at right angles to their planes. At the end of this pivotal displacement, the rear end of the vehicle is parked in the alignment L and the operation is thus completed.

When traveling at a medium or high speed, only medium-radius or large-radius curves can be negotiated. When making turns on such curves, the configuration and respective speed of the wheels 1 and 2 which are all parallel to each other exhibit hardly any difference with respect to theoretically perfect configurations and speeds. Furthermore, above a fairly low speed, even if one wheel considered has a ratio of tangential force to weight transmitted to the ground which is lower than the coefficient of friction of the wheel with the ground surface, said wheel may have a displacement with respect to the ground which does not correspond exactly to its orientation and its speed of rotation. For all these reasons, the procedure explained in the foregoing in connection with turning operations in circular paths having a very short radius as illustrated in FIGS. 4 and 5 does not necessarily take place when negotiating curves of longer radius. In other words, when the vehicle travels on a curved path, it does not necessarily follow that the tangential force transmitted to the ground by the wheels 2 is such that the ratio between the tangential force effectively transmitted to the ground and the weight P2 is higher than f2.

The wheels 1 and 2 therefore all remain in conditions of adherence and the tires with which they are equipped permit a drift which is compatible with this type of path. (The conditions of adherence are the conditions in which at least one point of the pneumatic tire is motionless with respect to the ground or road surface; it is known that a tire is capable of drifting and undergoing deformation while remaining in conditions of adherence).

Both while turning on a curve having a very short radius and while turning on curves having much longer radii, the rear wheels 2 produce as a result of contact with the road surface, and by reason of their speed of rotation which is the same as that of the front wheels 1, a vertical-axis torque which assists the pivotal displacement of the vehicle along its curvilinear path of travel.

In the example shown in FIG. 6, the vehicle is identical with FIG. 1 except for the fact that it has only one rear wheel 2 disposed in the longitudinal mid-plane of the vehicle. Preferably, the computer 7 controls the wheel 2 in dependence on a speed reference value equal to the value chosen for the front wheel 1 which rotates at a higher speed than the other front wheel. Taking into account the weight P2 transmitted by the single wheel 2 (which is liable to be a relatively high value), it will also be possible to choose a value of maximum tangential force T2 which is higher than the value T1.

As has been seen throughout the foregoing description, the invention proposes a simple and ingenious system for guiding a vehicle having more than two driving wheels, especially if said vehicle is provided with programmed-motion wheels. In order to achieve different conditions on the front wheels and rear wheels, it would also be possible to modify the coefficients of friction f1 and f2 or else the maximum forces T1 and T2 which can be applied.

In the examples described, consideration has been given solely to the static distribution of the weight of the vehicle at the different wheels. As is already known, this distribution can vary fairly considerably under certain dynamic conditions. In this respect, the numerical example given provides a fairly wide margin of safety. However, the computer 7 can be programmed in such a manner as to vary the maximum force T1, T2 which can be applied to each wheel as a function of the bearing pressure of the wheel on the ground or road surface.

In an alternative arrangement, the wheels 2 could be the front wheels and the wheels 1 could be the rear wheels without making any change in the diagram of FIG. 1 apart from the direction of rotation of the wheels in forward motion.

What is claimed is:

1. A land vehicle comprising at least two lateral driving wheels (1) and at least one other driving wheel (2), said driving wheels being given a substantially fixed orientation in the longitudinal direction of the vehicle, a power supply source (13), and means for adjusting the torque applied to each of said driving wheels (1, 2) as a function of the desired path of travel, wherein, in the case of a given driving wheel (1 or 2), the ratio (k1 or K2) of maximum tangential force (T1 or T2) transmitted to the periphery of the wheel to the weight (P1 or P2) transmitted to the ground by said wheel is lower than the usual coefficient of friction (F1) of the wheel (1) with the ground in the case of both lateral driving wheels (1) and is higher than the usual coefficient of friction (F2) of the wheel (2) with the ground (17) in the case of said at least one other driving wheel (2).

2. A land vehicle according to claim 1, wherein each said driving wheel (1, 2) is driven by a respective motor (3) and the vehicle further comprises processing means (7) for receiving data which define predetermined paths of travel of the vehicle and data delivered by detectors (4,6) for detecting the position of each said driving wheel (1, 2) in order to determine the power to be transmitted to the respective wheels with a view to imparting to said wheels a differential acceleration for the purpose of ensuring compliance with said path of travel.

3. A vehicle according to claim 1, wherein said vehicle comprises two of said at least one other driving wheel (2) and wherein said other driving wheels are disposed symmetrically with respect to the longitudinal midplane (P) of the vehicle.

4. A vehicle according to claim 3, wherein the track (V1) relative to the lateral driving wheels (1) is larger than the track (V2) relative to said two other driving wheels (2).

5. A vehicle according to claim 3, wherein the peripheries of the wheels are such that the usual coefficients of friction (F1, F2) of each wheel (1, 2) with the ground (17) are substantially equal, wherein the maximum tangential forces (T1, T2) transmittable to the periphery of each wheel (1, 2) are closely related and wherein the center of gravity G of the vehicle as seen from above is closer to the axis of the said lateral driving wheels (1) than to the axis of said other wheels (2).

6. A vehicle according to claim 3, wherein said vehicle comprises means (7) whereby each pair of driving wheels (1, 2) located on one and the same side of the vehicle is controlled at each instant in dependence on the same movement reference values.

7. A vehicle according to claim 1, having only one said other driving wheel, wherein said vehicle comprises means which tend to cause rotation of said other driving wheel (2) at the same speed as the lateral driving wheel (1) which rotates at the higher speed.

8. A method for turning a vehicle comprising at least two lateral driving wheels (1) and at least one other driving wheel (2), in which the torque imposed on each of the lateral driving wheels (1) is adjusted so that the ratio of the tangential force at the periphery of the wheel to the weight (P1) transmitted to the ground by said wheel is lower than the usual coefficient of friction (F1) of the wheel (1) on the ground (17) and so that each of the two lateral driving wheels (1) should have with respect to the other wheel relative accelerations corresponding to the desired variation in radius of curvature of the path of travel, and in which each said driving wheel (1,2) is maintained substantially parallel to the longitudinal direction of the vehicle, wherein the torque imposed on said at least one other driving wheel (2) is so adjusted as to ensure that the ratio of the tangential force at the periphery of the wheel to the weight (P2) transmitted to the ground by said wheel is higher than the usual coefficient of friction (F2) of said wheel on the ground.

9. A method according to claim 8 for turning a vehicle having four driving wheels comprising two lateral driving wheels (1) and two of said at least one other driving wheels (2) wherein, in order to make a turn in situ, the two lateral driving wheels (1) are caused to rotate in opposite directions and said two other driving wheels (2) are caused to rotate in opposite directions.

10. A method according to claim 9 wherein, on each side of the vehicle, the lateral driving wheel (1) and the other driving wheel (2) are caused to rotate in the same direction.

* * * * *